(12) United States Patent
Juma et al.

(10) Patent No.: US 11,683,301 B2
(45) Date of Patent: Jun. 20, 2023

(54) AUTOMATICALLY OBTAINING A SIGNED DIGITAL CERTIFICATE FROM A TRUSTED CERTIFICATE AUTHORITY

(71) Applicant: Red Hat, Inc., Raleigh, NC (US)

(72) Inventors: Farah Juma, Toronto (CA); Darren Andrew Lofthouse, Biggleswade (GB)

(73) Assignee: Red Hat, Inc., Raleigh, NC (US)

( * ) Notice: Subject to any disclaimer, the term of this patent is extended or adjusted under 35 U.S.C. 154(b) by 227 days.

(21) Appl. No.: 16/939,646

(22) Filed: Jul. 27, 2020

(65) Prior Publication Data

US 2022/0029982 A1    Jan. 27, 2022

(51) Int. Cl.
  *H04L 9/40*     (2022.01)
  *H04L 9/08*     (2006.01)
  *H04L 9/32*     (2006.01)
  *H04L 67/01*    (2022.01)

(52) U.S. Cl.
  CPC ........ *H04L 63/0823* (2013.01); *H04L 9/0894* (2013.01); *H04L 9/3247* (2013.01); *H04L 63/166* (2013.01); *H04L 63/20* (2013.01); *H04L 67/01* (2022.05)

(58) Field of Classification Search
  CPC . H04L 63/0823; H04L 9/0894; H04L 9/3247; H04L 63/166; H04L 63/20; H04L 67/01; H04L 63/0272; H04L 63/062; H04L 9/3263
  See application file for complete search history.

(56) References Cited

U.S. PATENT DOCUMENTS

| | | | | |
|---|---|---|---|---|
| 7,024,691 B1 * | 4/2006 | Herzberg | .............. | H04L 63/102 726/5 |
| 8,595,816 B2 * | 11/2013 | Karasawa | ............... | G06F 21/33 726/10 |
| 8,707,027 B1 | 4/2014 | Naik | | |
| 8,738,902 B2 | 5/2014 | Yoo et al. | | |
| 8,869,259 B1 * | 10/2014 | Udupa | .................... | H04L 63/20 726/10 |

(Continued)

FOREIGN PATENT DOCUMENTS

EP    3528453 A1    8/2019

OTHER PUBLICATIONS

Ray M., et al., "Renegotiating TLS," PhoneFactor, Inc., Nov. 4, 2009, https://pdfs.semanticscholar.org/1061/99bc6833cabeebef335437202c3245d5efb5.pdf.

*Primary Examiner* — Michael R Vaughan
(74) *Attorney, Agent, or Firm* — Kilpatrick Townsend & Stockton LLP

(57) ABSTRACT

Signed digital certificates can be automatically obtained from a trusted certificate authority. For example, a computing device can receive a request associated with a handshake procedure for establishing a secure session between a client device and a server. The request can indicate a trusted certificate authority that issues signed digital certificates. The computing device can determine that a local key store that is local to the server does not have a signed digital certificate issued by the trusted certificate authority and responsively obtain the signed digital certificate from the trusted certificate authority. The computing device can return the signed digital certificate back to the client device as part of the handshake procedure to establish the secure session.

20 Claims, 4 Drawing Sheets

(56) References Cited

U.S. PATENT DOCUMENTS

| | | | |
|---|---|---|---|
| 10,193,698 B1 * | 1/2019 | Das | G06F 21/33 |
| 10,305,871 B2 | 5/2019 | Sullivan et al. | |
| 10,320,570 B2 | 6/2019 | Bracken et al. | |
| 10,554,402 B2 | 2/2020 | Henretty et al. | |
| 11,283,629 B2 * | 3/2022 | Juma | H04L 9/3268 |
| 11,290,283 B2 * | 3/2022 | Juma | H04L 9/3263 |
| 2003/0081783 A1 * | 5/2003 | Adusumilli | H04L 67/04 |
| | | | 713/153 |
| 2006/0005239 A1 * | 1/2006 | Mondri | H04L 9/3263 |
| | | | 726/13 |
| 2011/0126003 A1 * | 5/2011 | Engert | H04L 63/20 |
| | | | 715/764 |
| 2017/0019381 A1 * | 1/2017 | Khazan | H04L 63/166 |
| 2017/0033935 A1 * | 2/2017 | Clark | H04L 9/3265 |
| 2017/0195299 A1 | 7/2017 | James et al. | |
| 2017/0223054 A1 * | 8/2017 | Wing | H04L 63/0281 |
| 2017/0339130 A1 * | 11/2017 | Reddy | H04L 9/30 |

* cited by examiner

AUTOMATICALLY OBTAINING A SIGNED DIGITAL CERTIFICATE FROM A TRUSTED CERTIFICATE AUTHORITY

TECHNICAL FIELD

The present disclosure relates generally to server certificates. More specifically, but not by way of limitation, this disclosure relates to detecting the lack of a trusted signed digital certificate and automatically obtaining a signed digital certificate from a trusted certificate authority.

BACKGROUND

Transport Layer Security (TLS) is an example of a cryptographic protocol that provides end-to-end security of data sent between servers and clients over the Internet. TLS encrypts data sent over the Internet to ensure that eavesdroppers and hackers are unable to obtain information from Internet communications. Part of the TLS protocol involves a client connecting to a server to validate ownership of the server's public key prior to establishing a secure session between the client and the server. As part of the ownership validation process, the server transmits its public key to the client. The client generates and encrypts a pre-master secret using the server's public key and transmits the pre-master secret to the server. The server can use its private key to decrypt the pre-master secret, completing the ownership validation process. Once the client validates ownership of the server's public key, a session key is generated and used for encrypting and decrypting data communicated during a session. Once the session is over, the session key is discarded. The ownership validation process is normally accomplished using a signed digital certificate issued by a trusted third party known as a certificate authority, which asserts the authenticity of the server's public key.

DETAILED DESCRIPTION

During a handshake procedure (e.g., TLS handshake) for establishing a secure session in which encrypted communications are transmitted between a client and a server, the client can request a signed digital certificate from the server. In some cases, the client may only accept a signed digital certificate from one or more trusted certificate authorities to establish the secure session. If the server lacks a certificate that is issued by one of the certificate authorities that the client trusts, the server is not able to present an adequate signed digital certificate to the client and the handshake procedure will fail. Failure of the handshake procedure may prevent the client from establishing a session at all with the server, or may result in the client having an insecure connection with the server, making information sent between the server and client vulnerable to malicious actors.

Some examples of the present disclosure overcome one or more of the issues mentioned above by providing an automated process in which a server can automatically obtain a signed digital certificate from a certificate authority that is trusted by a client device if the server does not already have such a trusted signed digital certificate. In one example, a server can receive a request from a client device during a handshake procedure to establish a secure session. The request can indicate trusted certificate authorities for the client device. The server can determine if it has access to a signed digital certificate issued by one of the trusted certificate authorities. If the server determines it does not have access to a signed digital certificate issued by one of the trusted certificate authorities, the server can obtain the signed digital certificate by generating and transmitting a certificate signing request to one of the trusted certificate authorities. The trusted certificate authority can automatically respond to the certificate signing request with the signed digital certificate. The server can store the signed digital certificate in a local key store and return the signed digital certificate back to the client device as part of the handshake procedure to establish the secure session. The secure session can allow the client device and server to communicate data that is protected from being viewed or manipulated by other client devices or systems.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
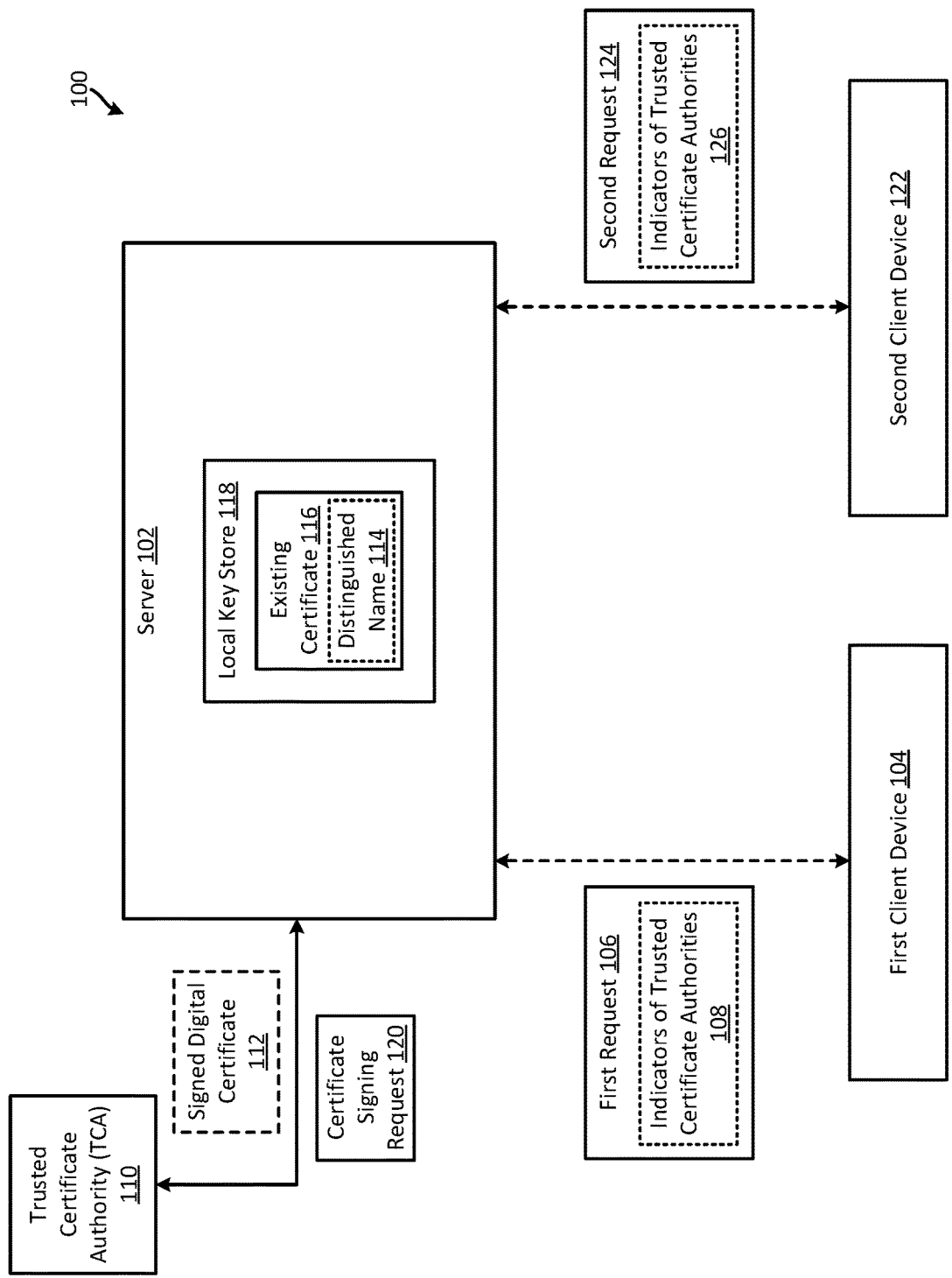
FIG. 1 is a block diagram of an example of a system for automatically obtaining a trusted signed digital certificate from a trusted certificate authority according to some aspects.

FIG. 1 is a block diagram of an example of a system 100 for automatically obtaining a trusted signed digital certificate from a trusted certificate authority according to some aspects. The system 100 can include a server 102 that can communicate with any number of client devices, such as first client device 104 and second client device 122. Examples of the client devices can include a desktop computer or a mobile device (e.g., a smartphone, laptop, or tablet).

In some examples, the first client device 104 can transmit a first request 106 to the server 102. The first client device 104 can transmit the first request 106 to the server 102 over a network, such as the Internet. The first request 106 can be associated with a handshake procedure for establishing a secure session between the first client device 104 and the server 102. The handshake procedure is represented in FIG. 1 by a dashed arrow between the first client device 104 and the server 102. The secure session can be an encrypted communication session that protects information sent between the server 102 and the first client device 104. In one example, the first request 106 can be a ClientHello message for initiating a Transport Layer Security (TLS) handshake.

The first request 106 can include indicators 108 of one or more trusted certificate authorities for the first client device 104. The indicators may be derived from a list of trusted certificate authorities stored in the memory of the first client device 104, and the trusted certificate authorities on the list may have been preselected by a user. The indicators may include names or other unique identifiers of the trusted certificate authorities. The server 102 can establish the secure session with the first client device 104, if the server 102 has a signed digital certificate issued by a trusted certificate authority (TCA) 110 designated by the indicators 108.

In some examples, the server 102 can access a local key store 118 to determine if any of the server's existing certificates, such as existing certificate 116, are issued by a TCA 110 indicated in the first request 106. A "local key store" can be a file-based or hardware-based key storage that is internal to the server 102, on the same local area network (LAN) as the server 102, or within the same physical infrastructure as the server 102. So, although the local key store 118 is shown as being internal to the server 102 in FIG. 1, in other examples the local key store 118 can be external to the server 102 and still considered "local" to the server 102. The local key store 118 can store existing certificates issued by certificate authorities for the server 102.

In some examples, the server 102 can determine that the local key store 118 does not include a signed digital certificate issued by the TCA 110 indicated in the first request 106. In response, the server 102 can obtain such a signed digital certificate 112 from the TCA 110. For example, the server 102 can access an existing certificate 116 stored in the local key store 118 to determine a distinguished name 114 (e.g., a domain name or other unique identifier) associated with the server 102. The server 102 can generate a private key and a certificate signing request 120 that includes the distinguished name 114 and transmit the certificate signing request 120 to the TCA 110. The TCA 110 can be configured to automatically respond to the certificate signing request 120 by providing the signed digital certificate 112. For example, the TCA 110 can be configured to use an automated certificate management environment (ACME) protocol to automatically respond to the certificate signing request 120 with the signed digital certificate 112. The server 102 can then return the signed digital certificate 112 back to the first client device 104 as part of the handshake procedure to establish the secure session. The client device 104 can determine that the signed digital certificate 112 is issued by one of its trusted certificate authorities and establish the secure session.

After receiving the signed digital certificate 112, in some examples the server 102 can store the generated private key along with the signed digital certificate 112 in the local key store 118. This can allow the signed digital certificate 112 to be used for responding to subsequent requests from one or more client devices in the future. For example, the server 102 can receive a second request 124 from the second client device 122 during a second handshake procedure. The second handshake procedure is indicated in FIG. 1 by a dashed arrow between the second client device 122 and the server 102. The second request 124 can include indicators 126 of trusted certificate authorities for the second client device 122. One of the indicators 126 can correspond to TCA 110. So, the server 102 can determine that the signed digital certificate 112 issued by the TCA 110 is stored in the local key store 118, obtain the signed digital certificate 112 from the local key store 118, and transmit the signed digital certificate 112 back to the second client device 122. The server 102 can transmit the signed digital certificate 112 back to the second client device 122 as part of the second handshake procedure, for establishing the second secure session.

Figure 2:
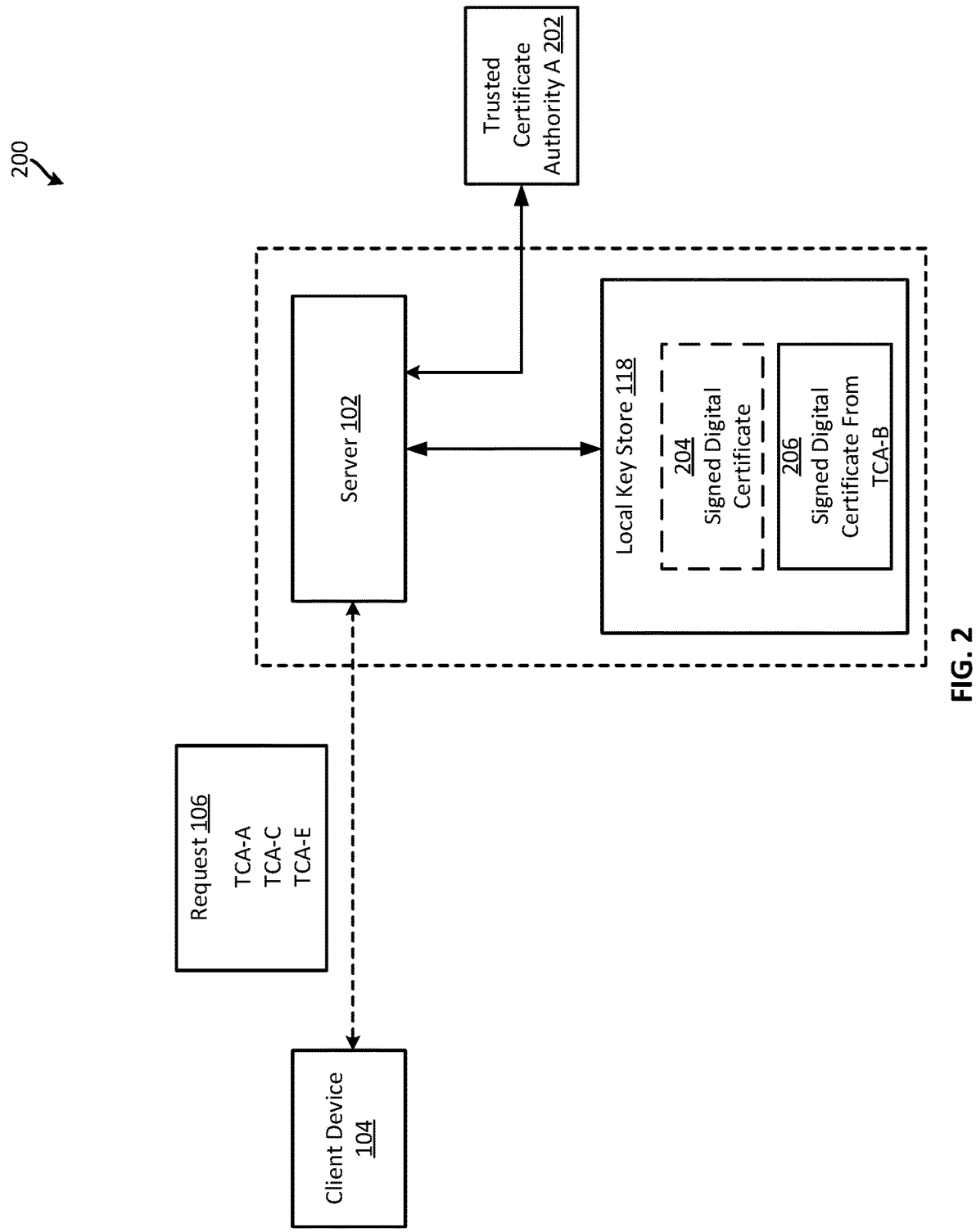
FIG. 2 is a block diagram of an example of a system for automatically obtaining a trusted signed digital certificate from a trusted certificate authority according to some aspects.

FIG. 2 is a block diagram of an example of a system 200 for automatically obtaining a trusted signed digital certificate from a trusted certificate authority according to some aspects. The system 200 can include a server 102. The server 102 can receive a first request 106 associated with a handshake procedure from a client device 104 for establishing a secure session. The handshake procedure is indicated in FIG. 2 by a dashed arrow between the client device 104 and the server 102. The client device 104 can be remote from the server 102, as indicated in FIG. 2 by the client device 104 being external to the dashed box.

The first request 106 can indicate one or more trusted certificate authorities (TCA) for the client device 104. For example, the first request 106 indicates TCA-A, TCA-C, and TCA-E are trusted certificate authorities for the client device 104. The server 102 can establish the secure session with the client device 104 if the server 102 has a signed digital certificate issued by TCA-A, TCA-C, or TCA-E.

In response to receiving the first request 106, the server 102 can analyze the first request 106 to determine the one or more TCAs specified therein. For example, the server 102 may extract TCA information from the first request 106. The server 102 can then access a local key store 118 with existing server certificates to determine if the local key store 118 includes any signed digital certificates associated with any of the TCAs specified in the first request 106. The local key store 118 can be local relative to the server 102, as indicated by the server 102 and the local key store 118 being in the dashed box in FIG. 2. For example, the local key store 118 can have a signed digital certificate from TCA-B 206, which is not one of the trusted certificate authorities specified in the first request 106. Since the local key store 118 does not have a signed digital certificate from any of the trusted certificate authorities specified in the first request 106, the server 102 can select one of the trusted certificate authorities and obtain a signed digital certificate from the trusted certificate authority. In the example shown in FIG. 2, the server 102 has selected trusted certificate authority A 202 from which to obtain a signed digital certificate 204. To obtain the signed digital certificate 204 from trusted certificate authority A 202, the server 102 can generate a certificate signing request that includes a distinguished name associated with another signed digital certificate, such as the signed digital certificate from TCA-B 206. The server 102 can then transmit the certificate signing request to the trusted certificate authority A 202, which can be remote from the server 102 as indicated in FIG. 2 by the trusted certificate authority A 202 being external to the dashed box. The trusted certificate authority A 202 can receive the certificate signing request and automatically respond to the certificate signing request with the signed digital certificate 204.

After receiving the signed digital certificate 204 from the trusted certificate authority A 202, the server 102 can forward the signed digital certificate 204 to the client device 104 during the handshake procedure. The client device 104 can receive the signed digital certificate 204 and determine that one of its trusted certificate authorities issued the signed digital certificate. In response, the client device 104 can allow the handshake procedure to continue (e.g., complete), so that a secure session can be established between the client device 104 and the server 102.

In some examples, the server 102 may also store the generated private key along with the signed digital certificate 204 in the local key store 118, which may be internal or external to the server 102. This may allow the signed digital certificate 204 to be used in response to subsequent requests from one or more client devices, without the server 102 having to re-obtain the signed digital certificate 204 from the trusted certificate authority A 202.

Figure 3:
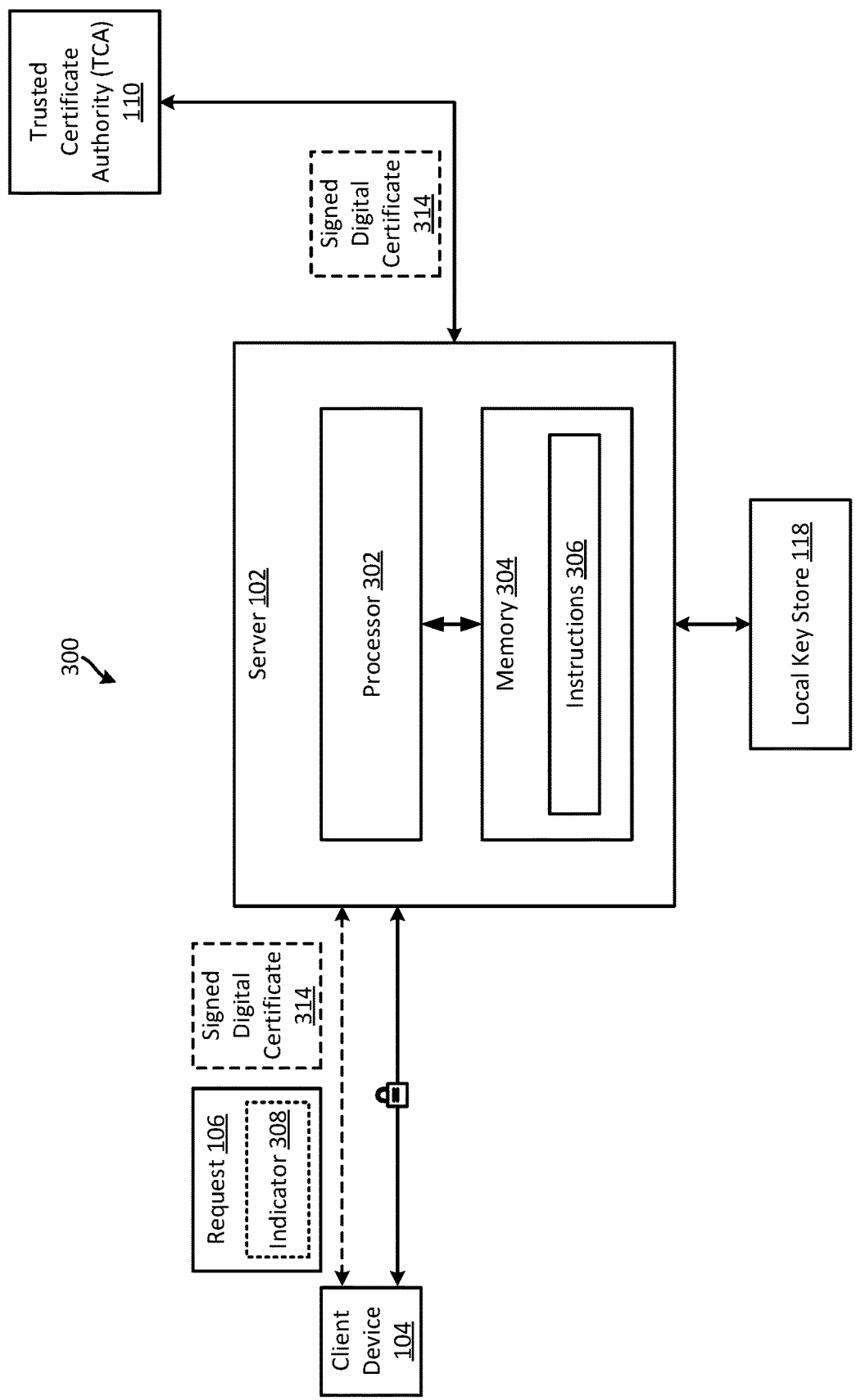
FIG. 3 is another example of a system for automatically obtaining a trusted signed digital certificate from a trusted certificate authority according to some aspects.

FIG. 3 is an example of a system 300 for automatically obtaining a trusted signed digital certificate from a trusted certificate authority according to some aspects. The system 300 includes a processor 302 communicatively coupled with a memory 304. In some examples, the processor 302 and the memory 304 can be part of a server, such as the server 102 of FIG. 1. Although the processor 302 and memory 304 are shown internal to the server in FIG. 3, one or both of those components can be external to the server 102 in other examples.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. In some examples, the instructions 306 can include processor-specific instructions generated by a compiler or an interpreter from code written in any suitable computer-programming language, such as C, C++, C#, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. In some examples, at least some of the memory can include a medium from which the processor 302 can read instructions 306. A computer-readable medium can include electronic, optical, magnetic, or other storage devices capable of providing the processor 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the processor 302 can receive a request 106 associated with a handshake procedure. The handshake procedure is represented in FIG. 3 by a dashed arrow between the client device 104 and the processor 302. The request 106 can be for establishing a secure session between a client device 104 and a server 102. The request 106 can include an indicator 308 of a trusted certificate authority (TCA) 110 that issues signed digital certificates. In response to receiving the request 106, the processor 302 can determine that a local key store 118 that is local to the server 102 does not have a signed digital certificate 314 issued by the TCA 110. The processor 302 can responsively obtain the signed digital certificate 314 from the TCA 110 and return the signed digital certificate 314 back to the client device 104 as part of the handshake procedure to establish the secure session. The secure session is represented in FIG. 3 by the solid arrow with a lock between the client device 104 and the server 102.

Figure 4:
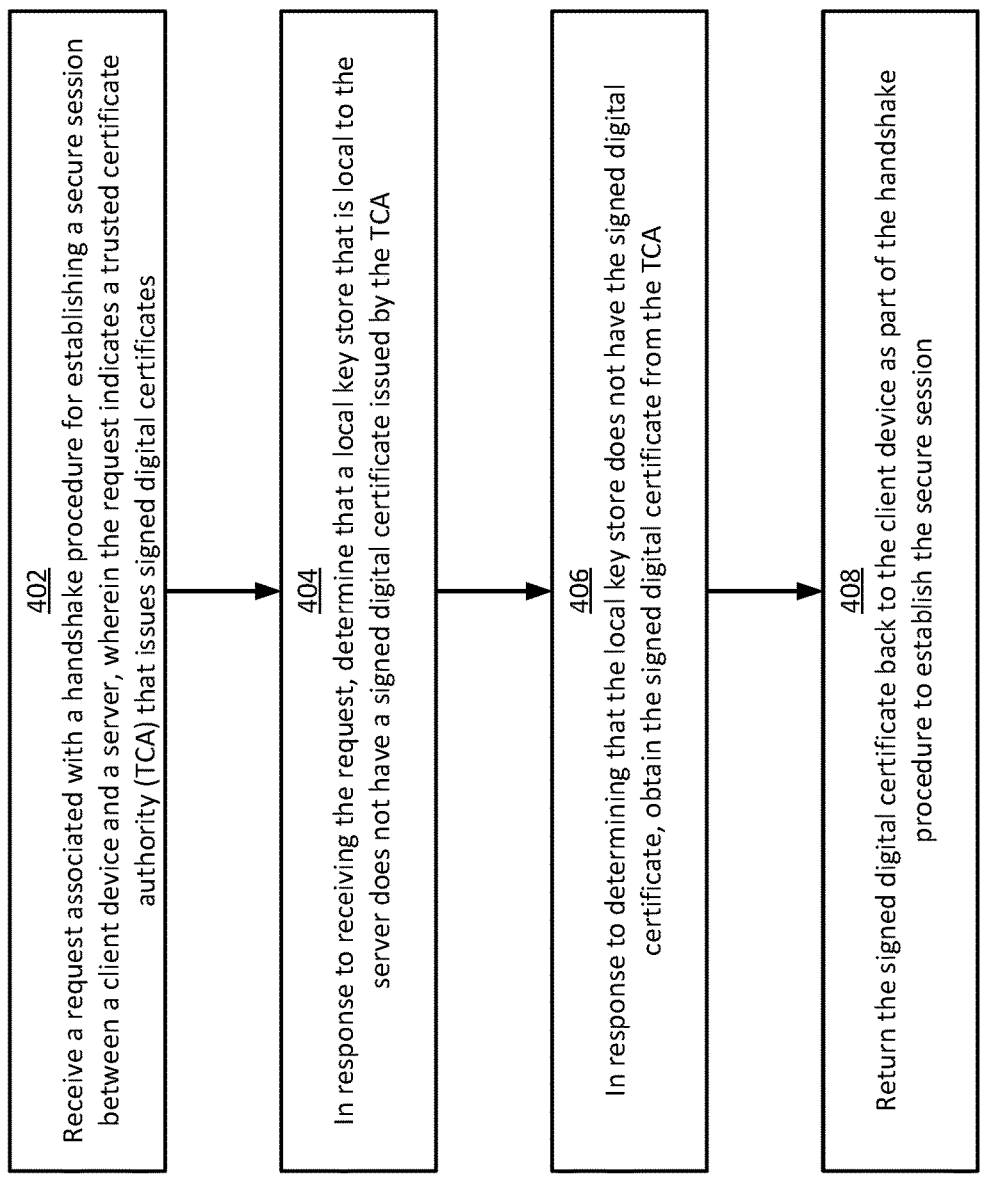
FIG. 4 is a flow chart of an example of a process for automatically obtaining a trusted signed digital certificate from a trusted certificate authority according to some aspects.

In some examples, the processor 302 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 402, the processor 302 can receive a request 106 associated with a handshake procedure for establishing a secure session between a client device 104 and a server 102. The request 106 can indicate a trusted certificate authority (TCA) that issues signed digital certificates. For example, the request 106 can include one or more indicators 308 of one or more TCAs, such as TCA 110.

In block 404, the processor 302 can, in response to receiving the request 106, determine that a local key store 118 that is local to the server 102 does not have a signed digital certificate 314 issued by the TCA 110. The local key store 118 can have a signed digital certificate 314 issued by the TCA 110 if the signed digital certificate 314 is stored in the local key store 118. And the local key store 118 may not have a signed digital certificate 314 issued by the TCA 110 if the signed digital certificate 314 is absent from storage media in the local key store 118. In some examples, the server 102 can access the local key store 118 to determine if any signed digital certificates issued by the TCA 110 are stored in the local key store 118. If so, the server 102 can determine that the local key store 118 has a signed digital certificate 314 issued by the TCA 110. If there are no signed digital certificates issued by the TCA 110 stored in the local key store 118, then the server 102 can determine that the local key store 118 does not have a signed digital certificate 314 issued by the TCA 110.

In block 406, the processor 302 can obtain the signed digital certificate 314 from the TCA 110 in response to determining that the local key store 118 does not have the signed digital certificate 314. For example, the processor 302 can generate a private key and a certificate signing request or another type of request that includes a distinguished name associated with the server 102. In some examples, the processor 302 may determine the distinguished name from an existing certificate stored in the local key store 118. The processor 302 can transmit the request to the TCA 110, which can automatically respond to the request with the signed digital certificate 314. The processor 302 may then store the generated private key along with the signed digital certificate 314 in the local key store 118 to be used for responding to subsequent requests from one or more client devices.

In block 408, the processor 302 can return the signed digital certificate 314 back to the client device 104 as part of the handshake procedure to establish the secure session. Establishing the secure session can allow the client device 104 and the server 102 to further interact with one another in a secure manner, such as by using encrypted communications.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A server comprising:
a processor; and
a memory including instructions that are executable by the processor for causing the processor to:
receive a request from a client device, the request being associated with a handshake procedure for establishing a secure session between the client device and the server, wherein the request includes an identifier of a trusted certificate authority (TCA) that issues signed digital certificates; and
in response to receiving the request:
determine that a local key store that is local to the server does not have a signed digital certificate issued by the TCA;
in response to determining that the local key store does not have the signed digital certificate, obtain the signed digital certificate from the TCA; and return the signed digital certificate back to the client device as part of the handshake procedure to establish the secure session, thereby allowing the client device to engage in encrypted communications with the server.

2. The server of claim 1, wherein the handshake procedure is a Transport Layer Security (TLS) handshake, and the request is for initiating the handshake procedure.

3. The server of claim 1, wherein the request includes a plurality of identifiers of a plurality of TCAs.

4. The server of claim 1, wherein the memory further includes instructions that are executable by the processor for causing the processor to obtain the signed digital certificate from the TCA by:
  determining a distinguished name associated with the server from an existing certificate already stored in the local key store;
  generating a private key and a certificate signing request that includes the distinguished name; and
  transmitting the certificate signing request to the TCA, the TCA being configured to automatically respond to the certificate signing request with the signed digital certificate.

5. The server of claim 4, wherein the memory further includes instructions that are executable by the processor for causing the processor to, subsequent to obtaining the signed digital certificate:
  store the generated private key along with the signed digital certificate in the local key store, the stored signed digital certificate being usable for responding to subsequent requests from one or more client devices.

6. The server of claim 5, wherein the request is a first request, the client device is a first client device, the handshake procedure is a first handshake procedure, the secure session is a first secure session, and the memory further includes instructions that are executable by the processor for causing the processor to:
  receive a second request from a second client device to initiate a second handshake procedure for establishing a second secure session with the server, the second request including the identifier of the TCA;
  in response to receiving the second request, determine that the signed digital certificate is stored in the local key store;
  in response to determining that the signed digital certificate is stored in the local key store, obtain the signed digital certificate from the local key store; and
  transmit the signed digital certificate back to the second client device as part of the second handshake procedure to establish the second secure session.

7. The server of claim 1, wherein the memory further includes instructions that are executable by the processor for causing the processor to obtain the signed digital certificate from the TCA by:
  transmitting a communication to the TCA via a network, wherein the communication is transmitted to the TCA subsequent to an initiation of the handshake procedure and prior to a conclusion of the handshake procedure.

8. A method comprising:
  receiving, by a processor of a server, a request from a client device, the request being associated with a handshake procedure for establishing a secure session between the client device and the server, wherein the request includes an identifier of a trusted certificate authority (TCA) that issues signed digital certificates;
  in response to receiving the request, determining, by the processor of the server, that a local key store that is local to the server does not have a signed digital certificate issued by the TCA;
  in response to determining that the local key store does not have the signed digital certificate, obtaining, by the processor of the server, the signed digital certificate from the TCA; and
  returning, by the processor of the server, the signed digital certificate back to the client device as part of the handshake procedure to establish the secure session, thereby allowing the client device to engage in encrypted communications with the server.

9. The method of claim 8, wherein the handshake procedure is a Transport Layer Security (TLS) handshake, and the request is for initiating the handshake procedure.

10. The method of claim 8, wherein request includes a plurality of identifiers of a plurality of TCAs.

11. The method of claim 8, further comprising causing the processor to obtain the signed digital certificate from the TCA by:
  determining a distinguished name associated with the server from an existing certificate already stored in the local key store;
  generating a private key and a certificate signing request that includes the distinguished name; and
  transmitting the certificate signing request to the TCA, the TCA being configured to automatically respond to the certificate signing request with the signed digital certificate.

12. The method of claim 11, further comprising:
  subsequent to obtaining the signed digital certificate, storing the generated private key along with the signed digital certificate in the local key store, the stored signed digital certificate being usable for responding to subsequent requests from one or more client devices.

13. The method of claim 8, wherein the request is a first request, the client device is a first client device, the handshake procedure is a first handshake procedure, the secure session is a first secure session, and further comprising:
  receiving a second request from a second client device to initiate a second handshake procedure for establishing a second secure session with the server, the second request including the identifier of the TCA;
  in response to receiving the second request, determining that the signed digital certificate is stored in the local key store;
  in response to determining that the signed digital certificate is stored in the local key store, obtaining the signed digital certificate from the local key store; and
  transmitting the signed digital certificate back to the second client device as part of the second handshake procedure to establish the second secure session.

14. The method of claim 8, further comprising obtaining the signed digital certificate from the TCA by:
  transmitting a communication to the TCA via a network, wherein the communication is transmitted to the TCA subsequent to an initiation of the handshake procedure and prior to a conclusion of the handshake procedure.

15. A non-transitory computer-readable medium comprising program code that is executable by a processor of a server for causing the server to:
  receive a request from a client device, the request being associated with a handshake procedure for establishing a secure session between the client device and the server, wherein the request includes an identifier of a trusted certificate authority (TCA) that issues signed digital certificates;

in response to receiving the request, determine that a local key store that is local to the server does not have a signed digital certificate issued by the TCA;

in response to determining that the local key store does not have the signed digital certificate, obtain the signed digital certificate from the TCA; and return the signed digital certificate back to the client device as part of the handshake procedure to establish the secure session, thereby allowing the client device to engage in encrypted communications with the server.

16. The non-transitory computer-readable medium of claim 15, wherein the handshake procedure is a Transport Layer Security (TLS) handshake, and the request is for initiating the handshake procedure.

17. The non-transitory computer-readable medium of claim 15, wherein the request includes a plurality of identifiers of a plurality of TCAs.

18. The non-transitory computer-readable medium of claim 15, further comprising program code that is executable by the processor for causing the processor to obtain the signed digital certificate from the TCA by:

determining a distinguished name associated with the server from an existing certificate already stored in the local key store;

generating a private key and a certificate signing request that includes the distinguished name; and transmitting the certificate signing request to the TCA, the TCA being configured to automatically respond to the certificate signing request with the signed digital certificate.

19. The non-transitory computer-readable medium of claim 18, further comprising program code that is executable by the processor for causing the processor to, subsequent to obtaining the signed digital certificate:

store the generated private key along with the signed digital certificate in the local key store, the stored signed digital certificate being usable for responding to subsequent requests from one or more client devices.

20. The non-transitory computer-readable medium of claim 15, wherein the request is a first request, the client device is a first client device, the handshake procedure is a first handshake procedure, the secure session is a first secure session, and further comprising program code that is executable by the processor for causing the processor to:

receive a second request from a second client device to initiate a second handshake procedure for establishing a second secure session with the server, the second request including the identifier of the TCA;

in response to receiving the second request, determine that the signed digital certificate is stored in the local key store;

in response to determining that the signed digital certificate is stored in the local key store, obtain the signed digital certificate from the local key store; and transmit the signed digital certificate back to the second client device as part of the second handshake procedure to establish the second secure session.

* * * * *